US012810738B2

(12) United States Patent
He et al.

(10) Patent No.: US 12,810,738 B2
(45) Date of Patent: Nov. 24, 2026

(54) METHOD AND SYSTEM FOR AUTOMATICALLY SWITCHING NAVIGATION MODES FOR AIR MOBILITY VEHICLES

(71) Applicant: HONEYWELL INTERNATIONAL INC., Charlotte, NC (US)

(72) Inventors: Gang He, Morris Plains, NJ (US); Zdenek Eichler, Brno (CZ); Dariia Averkova, Phoenix, AZ (US); Heenal Patel, Phoneix, AZ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 78 days.

(21) Appl. No.: 18/826,419

(22) Filed: Sep. 6, 2024

(65) Prior Publication Data

US 2026/0073798 A1 Mar. 12, 2026

(51) Int. Cl.
*G08G 5/50* (2025.01)
*G08G 5/21* (2025.01)
*G08G 5/55* (2025.01)

(52) U.S. Cl.
CPC ................. *G08G 5/50* (2025.01); *G08G 5/21* (2025.01); *G08G 5/55* (2025.01)

(58) Field of Classification Search
None
See application file for complete search history.

(56) References Cited

U.S. PATENT DOCUMENTS

| | | | | |
|---|---|---|---|---|
| 4,043,526 | A * | 8/1977 | Donley | G05D 1/0077 318/563 |
| 2009/0043431 | A1* | 2/2009 | Marze | B64C 27/001 701/5 |
| 2015/0356873 | A1* | 12/2015 | Kneuper | G08G 5/21 701/439 |
| 2022/0388674 | A1 | 12/2022 | Kanagarajan et al. | |
| 2023/0333552 | A1* | 10/2023 | Duguid | G05D 1/0044 |

(Continued)

FOREIGN PATENT DOCUMENTS

| | | | |
|---|---|---|---|
| CN | 105588579 | A | 5/2016 |
| CN | 105912288 | A | 8/2016 |
| CN | 110136298 | A | 8/2019 |

(Continued)

OTHER PUBLICATIONS

Federal Aviation Administration (F.A.A), Aeronautical Information Manual, Official Guide to Basic Flight Information and ATC Procedures (2023) (Year: 2023).*

*Primary Examiner* — Shayne M. Gilbertson
(74) *Attorney, Agent, or Firm* — Ingrassia Fisher & Lorenz

(57) ABSTRACT

A method and system for automatically determining a flight mode display for an electric vertical take-off and landing (eVTOL) aircraft has been developed. First, the flight rules and airspace type that are currently used by the eVTOL aircraft are determined. The flight mode display is automatically set to a traffic avoidance mode if the eVTOL aircraft currently uses VFR and VF are currently used in a congested airspace. The flight mode display is automatically set to an auto-pilot mode if the eVTOL aircraft is operating in an urban air mobility (UAM) corridor. The flight mode display is automatically set to a manual mode if a system failure of the auto-pilot mode occurs.

17 Claims, 5 Drawing Sheets

(56) References Cited

U.S. PATENT DOCUMENTS

| | | | | |
|---|---|---|---|---|
| 2023/0343230 | A1* | 10/2023 | Park | G08G 5/57 |
| 2024/0282199 | A1* | 8/2024 | Veerayya | G08G 5/54 |

FOREIGN PATENT DOCUMENTS

| | | | | | |
|---|---|---|---|---|---|
| CN | 112896534 | A | | 6/2021 | |
| EP | 4362002 | A1 | * | 5/2024 | G08G 5/723 |
| WO | 2021134607 | A1 | | 7/2021 | |
| WO | 2022036500 | A1 | | 2/2022 | |

* cited by examiner

METHOD AND SYSTEM FOR AUTOMATICALLY SWITCHING NAVIGATION MODES FOR AIR MOBILITY VEHICLES

TECHNICAL FIELD

The present invention generally relates to navigation avionics for aircraft and more particularly relates to a method and system for automatically switching navigation modes for air mobility vehicles.

BACKGROUND

An air mobility vehicle ("AMV") flies in different kind of airspaces. Besides traditional airspaces (i.e., classes A-G), there are new kinds of airspaces being introduced dedicated for urban air mobility (UAM) aircraft. Each type of airspace has different requirements for pilot to operate the aircraft. Hence, there is a need for a method and system for automatically switching navigation modes for air mobility vehicles.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for automatically determining a flight mode display for an electric vertical take-off and landing (eVTOL) aircraft. The method comprises: determine the flight rules and airspace type that are currently used by the eVTOL aircraft; automatically set the flight mode display to a vectoring mode if instrument flight rules (IFR) are currently used by the eVTOL aircraft; automatically set the flight mode display to a traffic avoidance mode if VFR are currently used in a congested airspace by the eVTOL aircraft; automatically set the flight mode display to an auto-pilot mode if the eVTOL aircraft is operating in an urban air mobility (UAM) corridor; and automatically set the flight mode display to a manual mode if a system failure of the auto-pilot mode occurs.

A system is provided for automatically determining a flight mode display for an electric vertical take-off and landing (eVTOL) aircraft. The system comprises: a processor for a computing system onboard the eVTOL aircraft that accesses an airspace navigation database, where the processor determines the flight rules and airspace type that are currently used by the eVTOL aircraft; and a flight display device that, automatically sets the flight mode display to a vectoring mode if instrument flight rules (IFR) are currently used by the eVTOL aircraft, automatically sets the flight mode display to a traffic avoidance mode if visual flight rules (VFR) are currently used in a congested airspace by the eVTOL aircraft, automatically sets the flight mode display to an auto-pilot mode if the eVTOL aircraft is operating in an urban air mobility (UAM) corridor, and automatically sets the flight mode display to a manual mode if a system failure of the auto-pilot mode occurs.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for automatically determining a flight mode display for an electric vertical take-off and landing (eVTOL) aircraft has been developed. First, the flight rules and airspace type that are currently used by the eVTOL aircraft are determined. The flight mode display is automatically set to a vectoring mode if the eVTOL aircraft currently uses instrument flight rules (IFR) or visual flight rules (VFR) in an uncongested airspace. The flight mode display is automatically set to a traffic avoidance mode if the eVTOL aircraft currently uses VFR and VFR are currently used in a congested airspace. The flight mode display is automatically set to an auto-pilot mode if the eVTOL aircraft is operating in an urban air mobility (UAM) corridor. The flight mode display is automatically set to a manual mode if a system failure of the auto-pilot mode occurs.

As used herein, charts may be any aviation chart or aeronautical chart provided as an informational aid to a flight crew for flight planning purposes. Chart data is any data provided by an electronic chart or a data driven chart (DDC). Aircraft generally use electronic charts for providing a flight crew member with information specific to a particular route and/or airport. Electronic charts may include airport maps; intersections and taxiways data; procedures and data associated with approach, arrival, and departure; and any flight constraints associated with a current flight plan. A flight plan is a proposed strategy for an intended flight, includes details associated with the intended flight, and is usually filed with an aviation authority (e.g., Federal Aviation Administration). An intended flight may also be referred to as a "trip" and extends from a departure airport at the beginning point of the trip to a destination airport at the endpoint of the trip. An alert may be any signal or warning indicating potential non-compliance with constraints associated with the current flight plan. The alert may be implemented as a display of text and/or graphical elements, a sound, a light, or other visual or auditory warning signal onboard the aircraft.

Figure 1:
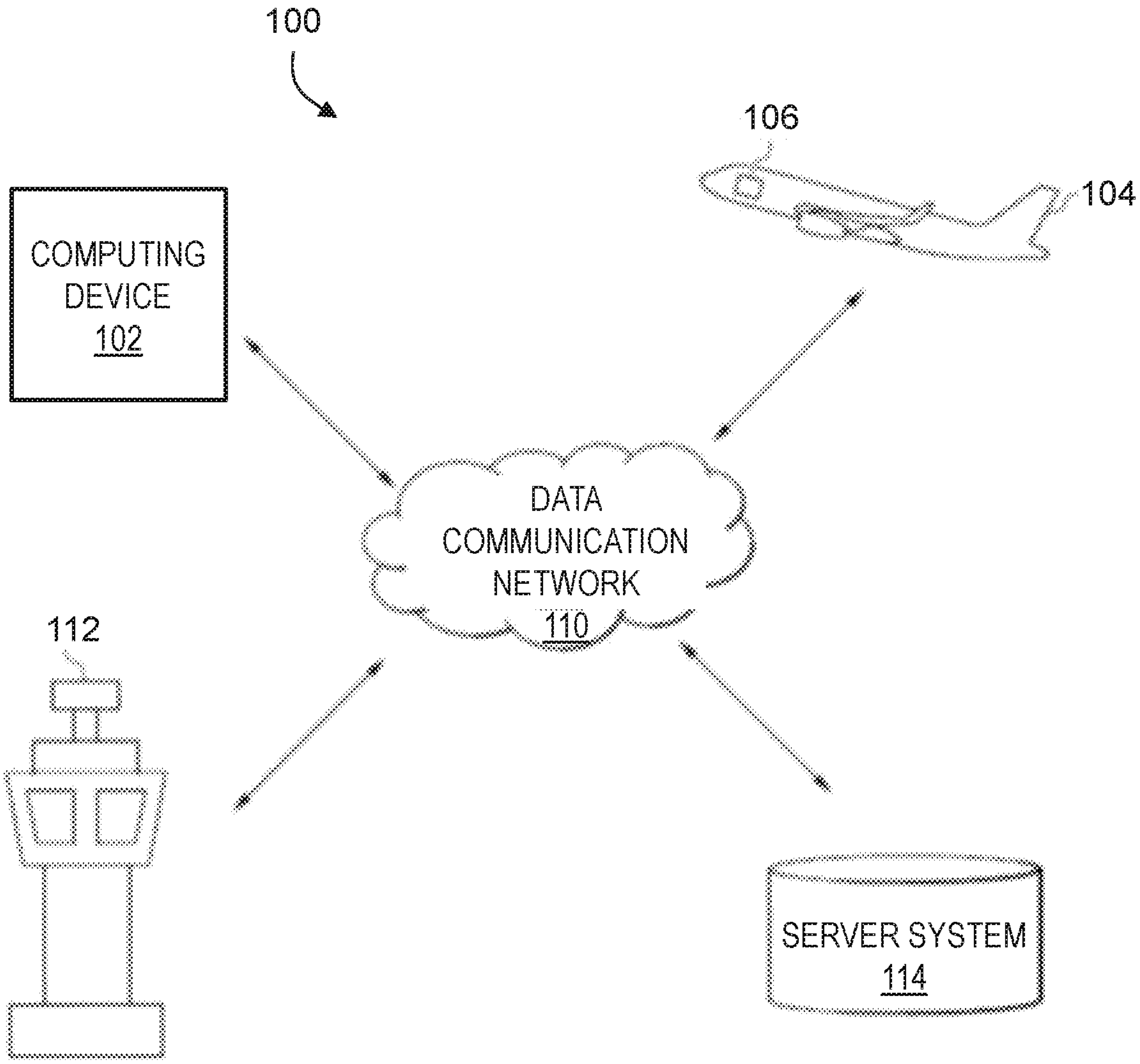
FIG. 1 is diagram of a system for automatically switching navigation modes for air mobility vehicles in accordance with the disclosed embodiments.

Turning now to the figures, FIG. 1 is a diagram of a system 100 for automatically switching navigation modes for air mobility vehicles in accordance with the disclosed embodiments. The system 100 operates with a current flight of the aircraft 104, to continuously monitor flight data and parameters during flight. The system 100 may include, without limitation, a computing device 102 that communicates with one or more avionics systems 106 onboard the aircraft 104, at least one server system 114, and air traffic control (ATC) 112, via a data communication network 110. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present emergency alerts when flight constraints may not be satisfied by the current flight of the aircraft 104. In other embodiments, the computing device 102 may be implemented using a computer system onboard the aircraft 104, which is configured to determine and present such emergency alerts.

The aircraft 104 may be any aviation vehicle for which flight constraints and alerts associated with non-compliance with flight constraints are relevant and applicable during completion of a flight route. The aircraft 104 may be implemented as an airplane, helicopter, spacecraft, hovercraft, or the like. The one or more avionics systems 106 may include a Flight Management System (FMS), crew alerting system (CAS) devices, automatic terminal information system (ATIS) devices, Automatic Dependent Surveillance-Broadcast (ADS-B), Controller Pilot Data Link Communication (CPDLC), navigation devices, weather radar, aircraft traffic data, and the like. Data obtained from the one or more avionics systems 106 may include, without limitation: an approved flight plan, an estimated time of arrival, instructions from air traffic control (ATC), Automatic Terminal Information Service (ATIS) data, flight plan restriction data, onboard equipment failure data, aircraft traffic data, weather data, or the like.

The server system 114 may include any number of application servers, and each server may be implemented using any suitable computer. In some embodiments, the server system 114 includes one or more dedicated computers. In some embodiments, the server system 114 includes one or more computers carrying out other functionality in addition to server operations. The server system 114 may store and provide any type of data used to determine compliance and/or non-compliance with constraints associated with the current flight. Such data may include, without limitation: flight plan data, flight plan constraint data, and other data compatible with the computing device 102.

The computing device 102 is usually located onboard the aircraft 104, and the computing device 102 communicates with the server system 114 and air traffic control 112 via a wireless communication connection. The computing device 102 and the server system 114 are generally disparately located, and the computing device 102 and air traffic control 112 are generally disparately located. The computing device 102 communicates with the server system 114 and air traffic control 112 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
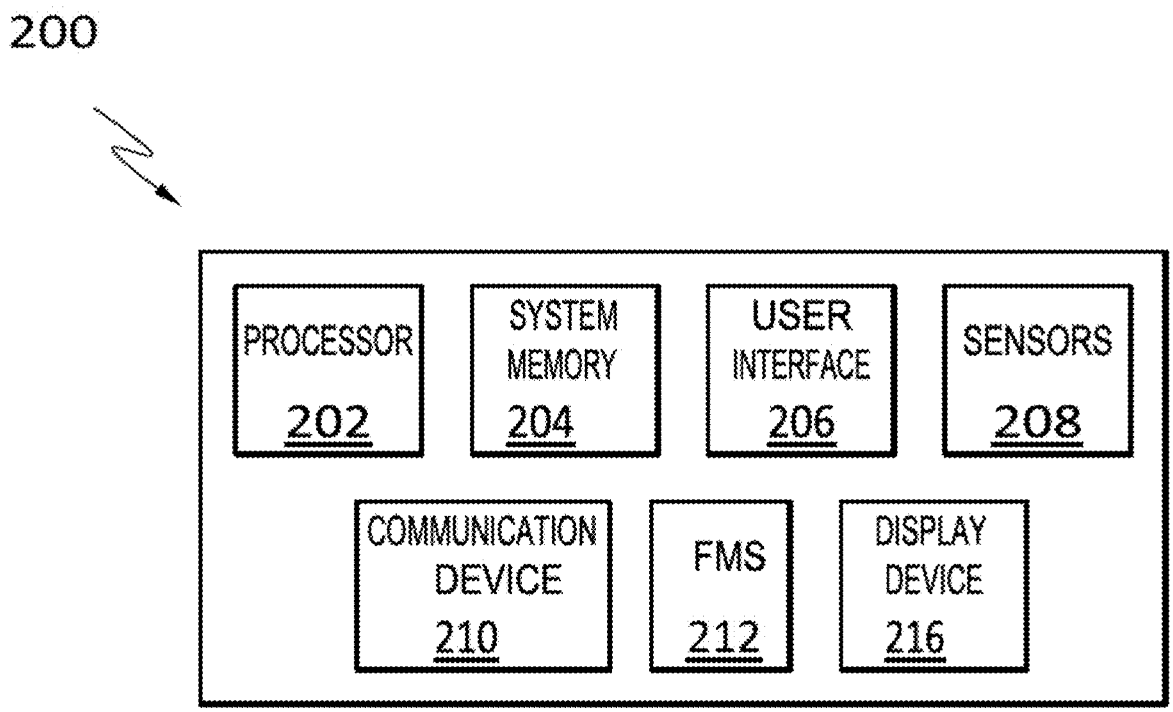
FIG. 2 is a functional block diagram of a computing device for an aircraft in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; flight management system 212; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
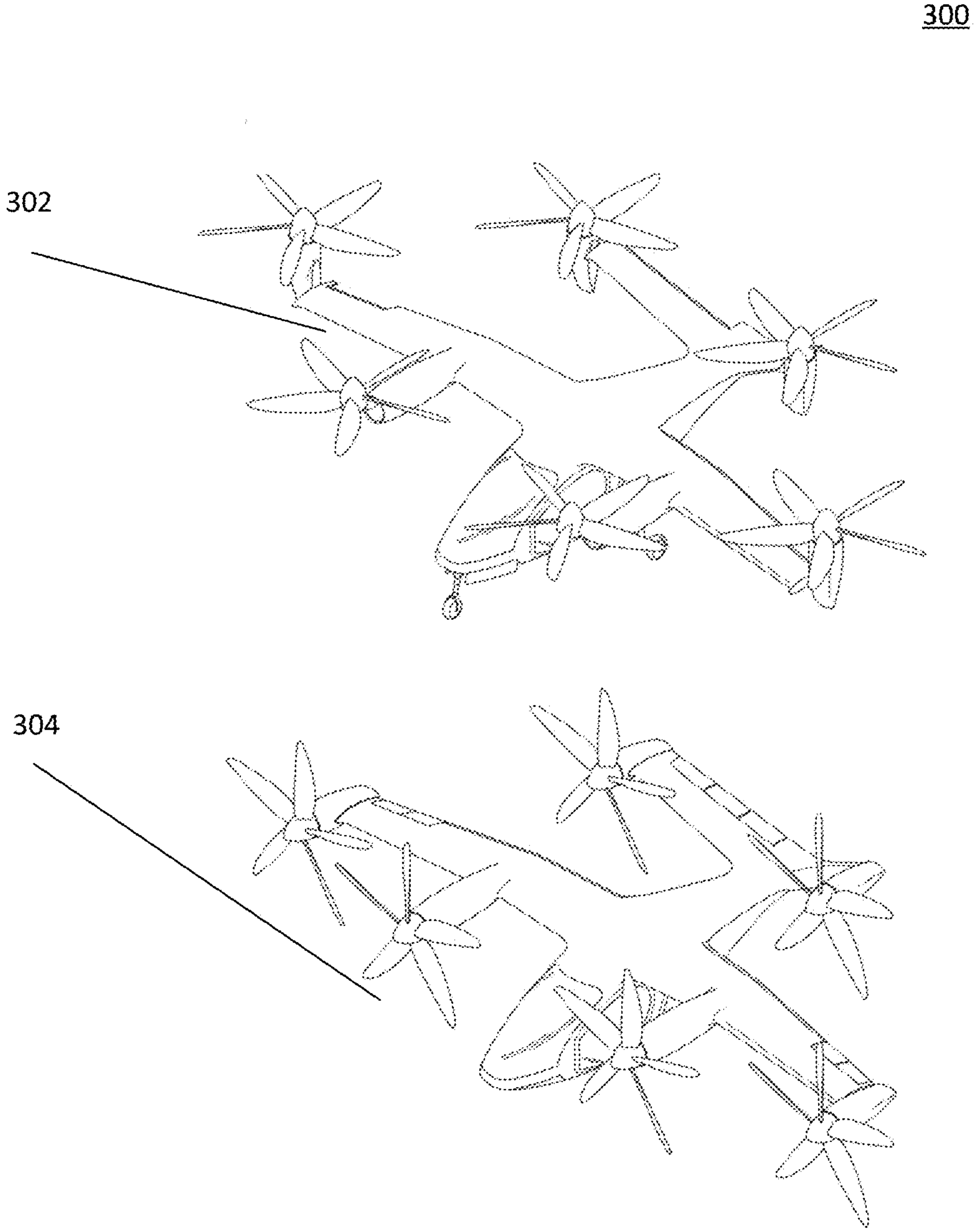
FIG. 3 is a diagram of a vertical takeoff and landing (VTOL) aircraft in accordance with the disclosed embodiments.
Figure 4:
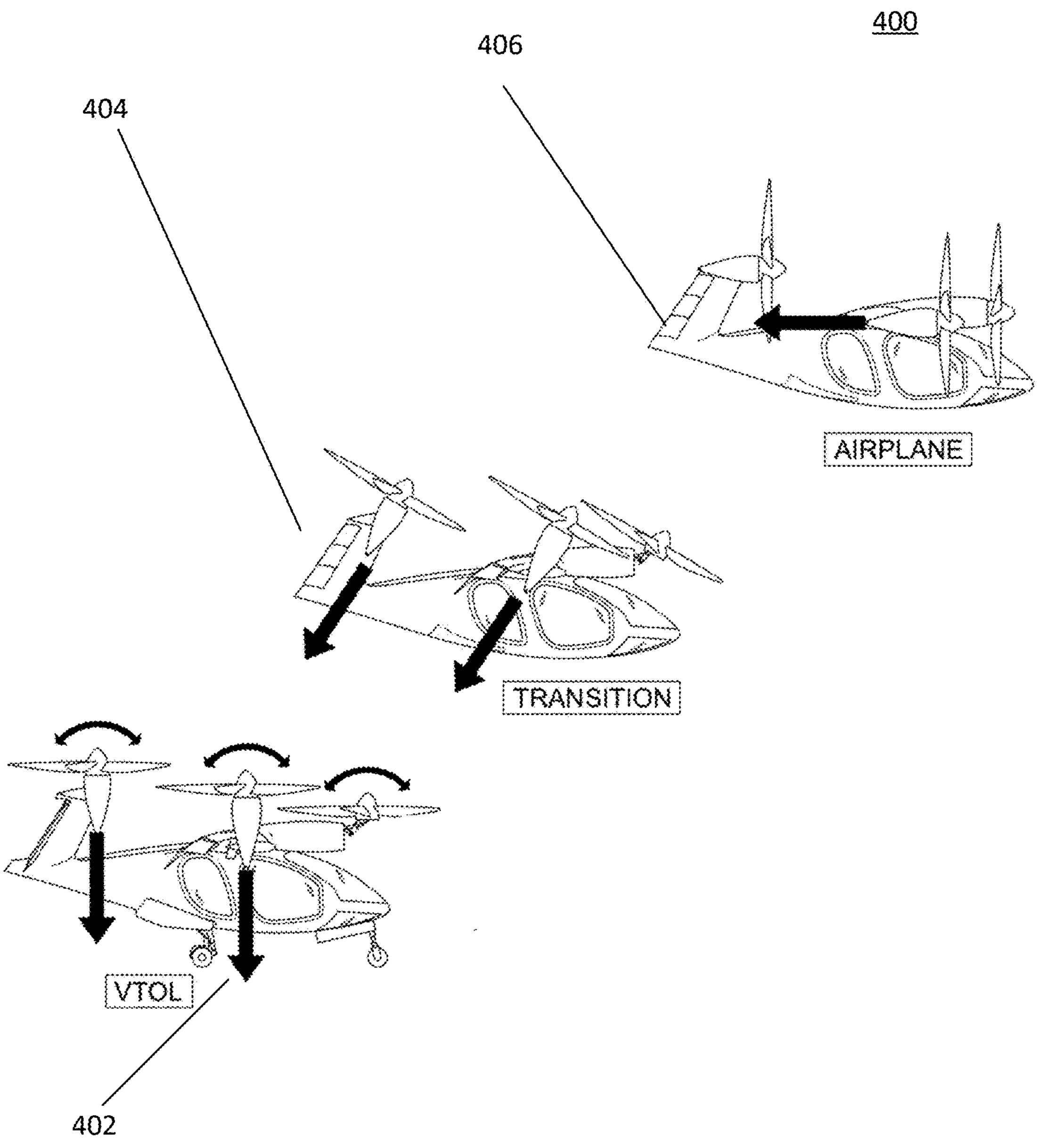
FIG. 4 is a diagram of operational orientations of a VTOL aircraft in accordance with the disclosed embodiments.

FIG. 3 is a diagram of a vertical takeoff and landing (VTOL) aircraft 300 in accordance with the disclosed embodiments. This embodiment shows a "tilt rotor" or "tilt engine" aircraft. The aircraft rotors have a vertical orientation when taking off or landing 302 that is similar to a conventional helicopter. The aircraft rotors have a horizontal orientation during flight 304 that is similar to a conventional airplane. FIG. 4 is a diagram of operational orientations of a VTOL aircraft 400 in accordance with the disclosed embodiments. These diagrams show an example of the orientation of the engines of the VTOL aircraft during take-off/landing 402, transitioning to flight 404, and flight 406. While a VTOL is shown in several embodiments, other types of aircraft a conventional helicopter or an electric VTOL (eVTOL) could also utilize the disclosed embodiments.

Advanced air mobility (AAM) vehicles such as an urban air mobility (UAM) vehicle or other types of eVTOLs are developing rapidly and the rules by which these vehicles are operating are also evolving. The overall regulatory landscape points to a gradual transition from traditional airspace operations to future dedicated UAM airspace operations. These vehicles must be capable of operating in traditional airspaces (e.g., classes A-G) and then transitioning into dedicated airspace for an AAM. Each combination of both airspace and flight rules have different requirements on a pilot, subsystem availability, system performance, and thus in human machine interface (HMI) of the aircraft.

For example, when operating near airport areas with class B/D airspace, these vehicles are following ATC instructions and the pilot HMI must be compatible with HMI which facilitates pilot tasks in the airspace operations. In contrast, the vehicles are operating more in auto-pilot mode when operating in dedicated UAM airspaces and flight corridors which are typically high-density airspace operations. Conflict management capabilities of auto-pilot mode in UAM corridors enable UAM operations without traditional ATC services. Separation within UAM Corridors may be provided through a layered approach of strategic and tactical deconfliction methods provided by autonomous algorithms, thus no direct ATC and/or pilot intervention is required to maintain separation.

In an auto-pilot mode, the pilot always needs to know the intent of the aircraft. However, if the system for conflict management is degraded, the pilot must revert back to ATC for conflicts management or using visual flight rules (VFR) to perform operations. The HMI must be capable of transitioning into and supporting these operations while supporting simplified display formats and modes for auto-pilot operation within UAM corridors.

The display system of the aircraft identifies current aircraft position and analyzes the intended trajectory relative to navigational database (NAVDB) information that may include dedicated UAM flight corridors. The current performance of the aircraft is used to determine if the UAM aircraft can reliably stay within designated operation corridor. When aircraft is operating within traditional airspace with required ATC coordination, the display system automatically transitions into the mode compatible with such an operational environment. The functions such as display pages, communication, information exchange, and interpretation of ATC commands are prioritized and the pilot is notified. When operating in UAM designated corridor, a simplified display mode is presented and the pilot is notified of system status. When automatic separation management system degrades, the display mode can transition into VFR display modes with the pilot notified of the degradation.

The primary issue is that each airspace and flight rules requires different HMI elements for the pilot. For example, within instrument flight rules (IFR) airspaces (i.e., classes A-E) and VFR airspaces that are uncongested with air traffic (i.e., classes A-C), separation is provided by ATC and pilot needs to follow the instructed clearances, The pilot needs to be provided with HMI which supports the ATC instructions. Examples of ATC instructions to the pilot under these rules include: altitude change; speed change; heading change; hold altitude; hold location; clearance for departure, arrival, approach, etc.; flight path angle; and vertical rate. Examples of pilot communications to ATC under these rules include: unable to follow instructions notification; and location.

Within visual flight rules (VFR) airspaces (i.e., classes D-G), separation is responsibility of pilot. The pilot needs to look out and visually identify other traffic and solve potential conflicts. Specifically, in airspaces D to G under Visual Flight Rules (VFR), the pilot is primarily responsible for maintaining separation from other aircraft. The pilot manages these responsibilities by: looking out of the cockpit window; maintaining visual lookout using onboard equipment; identifying conflicting air traffic; resolving air traffic conflicts; maintaining communication with ATC; and using manual settings for the auto-pilot.

Within a UAM corridor ("U space"), separation is provided by computer algorithms without human intervention. Sensing and corresponding decisions are made by advanced systems capable of detecting and resolving conflicts without human intervention. These include sensing and avoidance technologies and machine learning decision making algorithms for strategic and tactical decisions using real time data from various sources, like automatic dependent service broadcast (ADSB), radar, weather radar and other sensors for identification of potential conflicts and calculation of appropriate avoidance maneuvers. An automated avoidance maneuver can be executed automatically after potential conflict is detected and an avoidance maneuver is calculated by adjustments of speed, altitude or heading without pilot intervention. The Pilot can just monitor situation, evaluated vehicles intent and intervene when necessary.

Each of the above mentioned situations (VFR, IFR, U-space) requires different HMI for efficient operations in the environment. Some of the functions required in (e.g., IFR flight in Airspace class A) are not usable when flying in U-space. Due to uncertain and expected transitions from traditional aviation settings to special airspace management for UAM type operations, facilitating the determination of operational environment, adjusting the pilot interface relevant to different flight rules and blending the solutions together is advantageous.

In the future, the UAM pilot may be replaced by trained operator and the HMI needs to be simplified and adaptive based on current situation and/or pilot training (e.g., the operator can fly only in U-space, but the pilot with a pilot license may be allowed to fly outside in normal airspaces). With present embodiments, the operator will be provided only with functions which are beneficial for current situation and functions which are not required will be removed automatically. These embodiments provide a mechanism to determine the transition and blending of the required information for on-board avionics to meet different level of operation need. Specifically, present embodiments simplify the display when flying in U-Space and decreases required training for future operator of UAM (e.g., not requiring a pilot license). This also provides clear indication to the pilot who is responsible for separation: Pilot, ATC or auto-pilot.

Some embodiments display only relevant information to the pilot based on current situation (e.g., airspace, flight rules) to reduce workload, increase situational awareness and decrease reaction times. Better usage of display space is provided to declutter the display and allow other uses for the display area. These features may decrease cost of training for future UAM operators without pilot license.

In an example of operation of some embodiments, the display system identifies the current aircraft position and analyzes the intended trajectory relative to airspace NAVDB that may include dedicated UAM flight corridor. The current aircraft navigation performance is used to determine if the UAM aircraft can reliably stay within designated operation corridor. When aircraft is operating within traditional airspace with required ATC coordination, the display system is automatically transitioned into the mode compatible with such operation environment. The functions such as related display pages, features facilitating communication, information exchange, and interpretation of ATC commands are prioritized for pilot notification. When operating in designated corridor, a simplified display mode is presented and the pilot is notified of system status.

For an example of an UAM operating in VFR airspace (e.g., airspaces D-G), separation is not maintained by ATC. The pilot is responsible for maintaining separation and safety of flight. The Pilot needs to visually look for traffic and replan the trajectory if necessary in order to keep the separation (e.g., decrease the speed or change heading temporarily). The pilot needs to be provided with HMI which supports these tasks including: showing suggested deconflict maneuver; confirming change of heading, speed or altitude; and holding position or altitude.

Traffic avoidance is managed automatically by flight planning. When the system detects failure of auto-pilot systems, the display automatically changes to support manual flight with or without cues from the pilot or operator. The display provides a single button to activate/deactivate auto-pilot and more importantly display the surrounding traffic, potential conflicts and how to solve the conflict. The resolution shows the intent of the vehicle so the pilot can intervene if necessary or takeover when automation fails.

Figure 5:
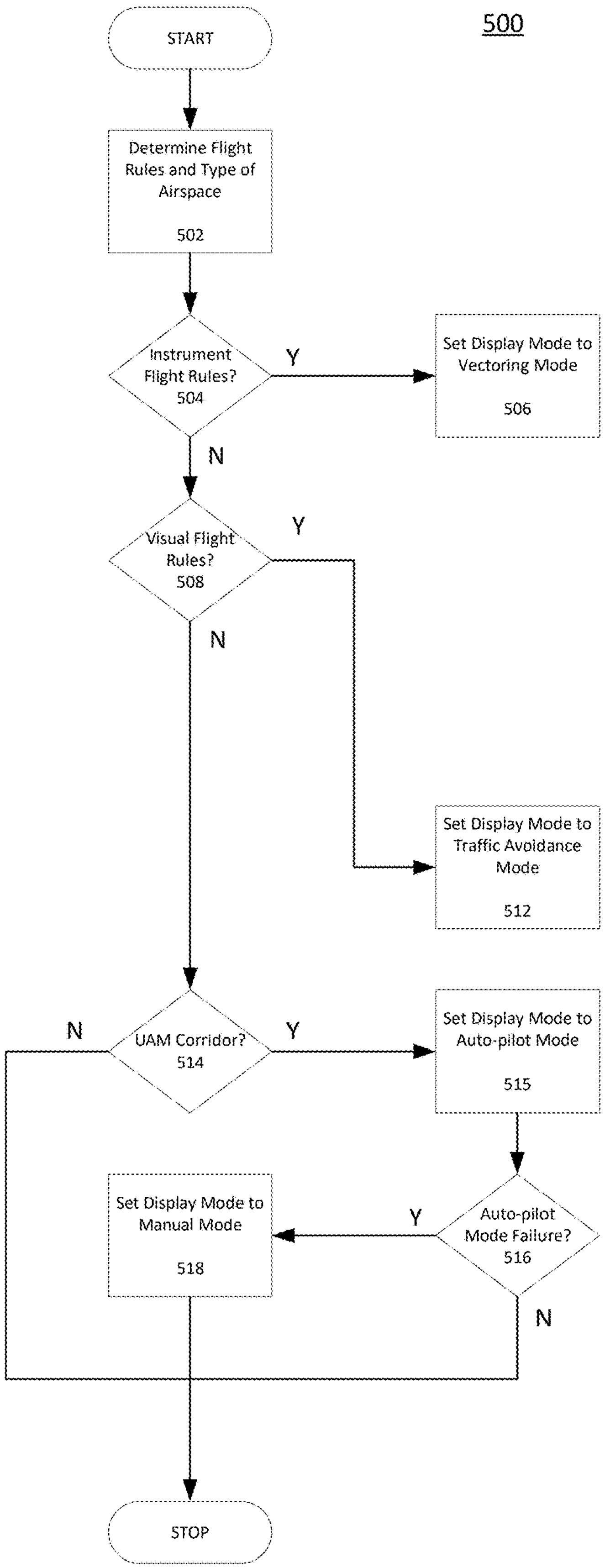
FIG. 5 is a flowchart of a method for automatically switching navigation modes for air mobility vehicles in accordance with the disclosed embodiments.

FIG. 5 is a flowchart of a method for automatically switching navigation modes for air mobility vehicles in accordance with the disclosed embodiments. First, the flight rules and airspace type that are currently used by the eVTOL aircraft are determined 502. The flight mode display is automatically set to a vectoring mode 506 if the eVTOL aircraft currently uses instrument flight rules (IFR) 504. The flight mode display is automatically set to a traffic avoidance mode 512 if the eVTOL. The flight mode display is automatically set to an auto-pilot mode 515 if the eVTOL aircraft is operating in an urban air mobility (UAM) corridor 514. The flight mode display is automatically set to a manual mode 518 if a system failure of the auto-pilot mode occurs 516.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions.

Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for automatically determining a flight mode display for an electric vertical take-off and landing (eVTOL) aircraft, comprising:

automatically determining current flight rules and current airspace type that are being used by the eVTOL aircraft while the eVTOL is in flight in order to automatically switch from a previous flight mode display to set a current flight mode display;

automatically setting a flight mode display among at least four different available flight mode displays depending on a combination of the determined current flight rules and current airspace type, wherein each different available flight mode display is associated with a different combination of pilot requirements, subsystem availability, system performance, and/or human machine interface (HMI) requirements to operate the aircraft in the combination of current flight rules and current airspace type of the set flight mode display, and including:

automatically setting the flight mode display to a vectoring mode when instrument flight rules (IFR) are currently used by the eVTOL aircraft, wherein the vectoring mode prioritizes display pages, communication, information exchange, and interpretation of air traffic control (ATC) commands;

automatically setting the flight mode display to a traffic avoidance mode when visual flight rules (VFR) are currently used in a congested airspace by the eVTOL aircraft, wherein the traffic avoidance mode supports pilot responsibility for separation from other aircraft by having the pilot view other aircraft;

automatically setting the flight mode display to an auto-pilot mode when the eVTOL aircraft is operating in an urban air mobility (UAM) corridor, wherein separation from other aircraft or objects within the UAM corridor is provided by autonomous algorithms, wherein the auto-pilot mode detects air traffic conflicts without pilot intervention, wherein the auto-pilot mode automatically resolves air traffic conflicts without pilot intervention, and wherein a simplified display mode is presented;

automatically setting the flight mode display to a manual mode when a system for conflict management is degraded or when a system failure of the auto-pilot mode occurs, wherein the flight mode display transitions into a VFR display mode and the pilot is notified of the degradation; and notifying the pilot of a transition among the vectoring mode, the traffic avoidance mode, the auto-pilot mode, and the manual mode.

2. The method of claim 1, where the eVTOL aircraft is an urban air mobility (UAM) aircraft.

3. The method of claim 1, where the vectoring mode requires a pilot to seek air traffic control (ATC) clearance for an altitude change.

4. The method of claim 1, where the vectoring mode requires a pilot to seek air traffic control (ATC) clearance for an airspeed change.

5. The method of claim 1, where the vectoring mode requires a pilot to seek air traffic control (ATC) clearance for a heading change.

6. The method of claim 1, where the vectoring mode requires a pilot to seek air traffic control (ATC) clearance for holding current altitude.

7. The method of claim 1, where the vectoring mode requires a pilot to seek air traffic control (ATC) clearance for holding current location.

8. The method of claim 1, where the vectoring mode requires a pilot to seek air traffic control (ATC) clearance for an approach of the aircraft.

9. The method of claim 1, where the vectoring mode requires a pilot to seek air traffic control (ATC) clearance for departure of the aircraft.

10. The method of claim 1, where the vectoring mode requires a pilot to seek air traffic control (ATC) clearance for a flight path angle.

11. The method of claim 1, where the vectoring mode requires a pilot to seek air traffic control (ATC) clearance for a vertical rate change.

12. The method of claim 1, where the traffic avoidance mode requires a pilot to maintain visual lookout for other aircraft.

13. The method of claim 1, where the traffic avoidance mode requires a pilot to identify conflicting air traffic.

14. The method of claim 1, where the traffic avoidance mode requires a pilot to adjust a flight path to avoid conflicting air traffic.

15. The method of claim 1, where the auto-pilot mode detects air traffic conflicts without pilot intervention.

16. The method of claim 1, where the auto-pilot mode automatically resolves air traffic conflicts without pilot intervention.

17. A system for automatically determining a flight mode display for an electric vertical take-off and landing (eVTOL) aircraft, comprising:

a processor for a computing system onboard the eVTOL aircraft that accesses an airspace navigation database, wherein the processor is arranged to determine current flight rules and an airspace type currently being used by the eVTOL aircraft while the eVTOL is in flight in order to automatically switch from a previous flight mode display to set a current flight mode display; and a flight display device arranged to operate by automatically setting a flight mode display among at least four available flight mode displays depending on a combination of the determined current flight rules and current airspace type, wherein each different available flight mode display is associated with a different combination of pilot requirements, subsystem availability, system performance, and/or human machine interface (HMI) requirements to operate the aircraft in the combination of flight rules and airspace type of the set flight mode display, and the flight display device being arranged to operate by:

automatically setting the flight mode display to a vectoring mode when instrument flight rules (IFR) are currently used by the eVTOL aircraft, wherein the vectoring mode prioritizes display pages, communication, information exchange, and interpretation of air traffic control (ATC) commands;

automatically setting the flight mode display to a traffic avoidance mode when visual flight rules (VFR) are currently used in a congested airspace by the eVTOL aircraft, wherein the traffic avoidance mode supports pilot responsibility for separation from other aircraft;

automatically setting the flight mode display to an auto-pilot mode when the eVTOL aircraft is operating in an urban air mobility (UAM) corridor, wherein separation within the UAM corridor is provided by autonomous algorithms, wherein the auto-pilot mode detects air traffic conflicts without pilot intervention, wherein the auto-pilot mode automatically resolves air traffic conflicts without pilot intervention, and wherein a simplified display mode is presented;

automatically setting the flight mode display to a manual mode when a system for conflict management is degraded or when a system failure of the auto-pilot mode occurs, wherein the flight mode display transitions into a VFR display mode and the pilot is notified of the degradation; and notifying the pilot of a transition among the vectoring mode, the traffic avoidance mode, the auto-pilot mode, and the manual mode.

* * * * *